(12) United States Patent
Erdmann et al.

(10) Patent No.: US 9,860,127 B2
(45) Date of Patent: Jan. 2, 2018

(54) METHOD FOR CONFIGURING A NETWORK

(75) Inventors: Bozena Erdmann, Aachen (DE);
Ludovicus Marinus Gerardus Maria Tolhuizen, Waalre (NL); Armand Michel Marie Lelkens, Heerlen (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 110 days.

(21) Appl. No.: 14/119,293

(22) PCT Filed: May 25, 2012

(86) PCT No.: PCT/IB2012/052635
§ 371 (c)(1),
(2), (4) Date: Nov. 21, 2013

(87) PCT Pub. No.: WO2012/168819
PCT Pub. Date: Dec. 13, 2012

(65) Prior Publication Data
US 2014/0105066 A1    Apr. 17, 2014

(30) Foreign Application Priority Data
Jun. 9, 2011 (EP) .................................... 11305720

(51) Int. Cl.
*H04L 12/24* (2006.01)
(52) U.S. Cl.
CPC ...... *H04L 41/0853* (2013.01); *H04L 41/0816* (2013.01); *H04L 41/12* (2013.01)
(58) Field of Classification Search
None
See application file for complete search history.

(56) References Cited

U.S. PATENT DOCUMENTS

2002/0091807 A1\* 7/2002 Goodman ................ G06F 8/65
709/221
2004/0081110 A1  4/2004 Koskimies
(Continued)

FOREIGN PATENT DOCUMENTS

| EP | 1408276 A2 | 4/2004 |
|----|------------|--------|
| EP | 2219320 A1 | 8/2010 |

(Continued)

OTHER PUBLICATIONS

The ZigBee Specification Document 05347r19, ZigBee Alliance, Oct. 12, 2010 ZigBee Standards Organization.
(Continued)

*Primary Examiner* — Charles C Jiang
*Assistant Examiner* — George Atkins, Jr.
(74) *Attorney, Agent, or Firm* — Meenakshy Chakravorty

(57) ABSTRACT

The present invention relates to a method for configuring a network comprising a maintenance entity and a plurality of nodes, the method comprising at the maintenance entity, the steps of: (a) detecting a potential presence in the network of at least one limited node, said limited node being able to receive data only within time periods; (b) determining that an updated network configuration parameter value is required, said network configuration parameter being common to the at least one limited node and to the plurality nodes of the network; (c) postponing a transmission of a signal for updating the network configuration parameter value at the plurality of nodes, based on the detection of the potential presence of the at least one limited node in the network; (d) transmitting a triggering signal for triggering delivery of the updated network configuration parameter value to the limited device; (e) transmitting the signal for updating the updated network configuration parameter value at the plurality of nodes.

17 Claims, 5 Drawing Sheets

(56) References Cited

U.S. PATENT DOCUMENTS

| | | | |
|---|---|---|---|
| 2006/0014534 A1* | 1/2006 | Costa-Requena ... | H04W 40/246 455/432.1 |
| 2006/0248116 A1* | 11/2006 | Sobel .................... | G06F 8/65 |
| 2010/0106836 A1* | 4/2010 | Schreyer ............... | G06F 9/542 709/226 |
| 2012/0296451 A1* | 11/2012 | Kaps .................... | H04L 12/282 700/83 |

FOREIGN PATENT DOCUMENTS

| | | |
|---|---|---|
| JP | 2009088750 | 4/2009 |
| WO | WO2009157758 A1 | 12/2009 |
| WO | WO2010128422 A1 | 11/2010 |

OTHER PUBLICATIONS

The ZigBee Document 095499 Control Your World, ZigBee Alliance, ZigBee Green Power Specification, Revision 16, v 0.9, May 16, 2011.

* cited by examiner

| Octets | 1 | 2 | 0/1 | 0/16 | 0/2 | Variable |
|---|---|---|---|---|---|---|
| Data type | 8-bit bitmap | Unsigned 16-bit integer | 8-bit bitmap | Unsigned 128-bit integer | Unsigned 16-bit integer | Set of unsigned 32-bit integers |
| Field name | Options | Update time | New channel | New key | New PANId | ZGPD list |

FIG. 1A

| Bits: 0-1 | 2-5 | 6 | 7 |
|---|---|---|---|
| Parameters presence | ZGPD list size | Perform TempMaster election | Ack request |

FIG. 1B

| Octets | 2 | 1 | 4 | 1 | Variable |
|---|---|---|---|---|---|
| Data type | Unsigned 16-bit integer | 8-bit bitmap | Unsigned 32-bit integer | Unsigned 8-bit integer | Octet string |
| Field name | ZGPP short address | ZGPP Tx channel | ZGPD SrcID | ZGPD command ID | ZGPD command payload |

FIG. 2A

| Bits: 0-3 | 4-7 |
|---|---|
| Transmit channel | Reserved |

FIG. 2B

| Octets | 1 | 2 | 1 | 1 | 2 | 4 | 1 | Variable |
|---|---|---|---|---|---|---|---|---|
| Data type | 8-bit bitmap | Unsigned 16-bit integer | 8-bit signed integer | 8-bit bitmap | 16-bit bitmap | Unsigned 32-bit integer | Unsigned 8-bit integer | Octet string |
| Field name | Options | Temp Master short address | Temp Master distance | Temp Master Tx channel | Timeout | ZGPD SrcID | ZGPD Command ID | ZGPD command payload |

FIG. 3A

| Bits: 0 | 1 | 2-7 |
|---|---|---|
| Ack request | Priority ZGPD command | Reserved |

FIG. 3B

| Octets | 2 | Variable |
|---|---|---|
| Data type | 16-bit bitmap | String of unsigned 32-bit integers |
| Field name | Options | ZGPD list |

FIG. 4A

| Bits: 0 | 1 | 2 | 3-5 | 6-9 | 10-15 |
|---|---|---|---|---|---|
| Key update report | Channel update report | PANId update report | update status | ZGPD list size | Reserved |

FIG. 4B

METHOD FOR CONFIGURING A NETWORK

CROSS-REFERENCE TO PRIOR APPLICATIONS

This application is a U.S. national stage application under 35 U.S.C. §371 of International Application No. PCT/IB2012/052635 filed on May 25, 2012, which claims priority to and the benefit of European Patent Application No. 11305720.2, filed on Jun. 9, 2011. These applications are hereby incorporated by reference herein.

FIELD OF THE INVENTION

The present invention relates to a method for configuring a network, to a maintenance entity and to a communication network comprising the maintenance entity and a plurality of nodes.

This invention is, for example, relevant for wireless networks where some of the nodes that need to be configured have some strong operational limitations, like only limited and unpredictable reception time windows. This is in particular the case for ZigBee Green Power Devices inside ZigBee networks.

BACKGROUND OF THE INVENTION

In a network, in particular in a wireless network, it is required to keep every node updated with the currently used value of network configuration parameters to maintain a correct operation for each node of the network. Indeed, it is possible that, due to unscheduled events, like a change in the interference spectrum or location, or due to scheduled events, like a periodic change of cryptographic key, a maintenance entity needs to communicate a new value for a network configuration parameter, like a channel identifier, a network identifier, node identifier or role, identifier of a new coordinator/maintenance entity inside the network, a cryptographic key or a key seed.

However, in some networks, there can be some nodes that are limited in terms of reception opportunities. As an illustration, in a ZigBee network, there may be ZigBee Green Power Devices (ZGPDs), which do not have a battery and can receive only at unscheduled opportunities. For example, a ZGPD can be a battery-less switch that can only receive for a short time once it is actuated by a user and has transmitted its signal. Another example of a ZGPD is a periodically-reporting sensor, harvesting energy from its environment, e.g. by means of a photovoltaic cell. Because of their energy budget limitations, those devices are also not able to discover the new parameters via an active search.

Given that these devices cannot receive a configuration signal at any time, if a reconfiguration of the network occurs in the interval between two reception opportunities of a limited device, this limited device would be unaware of the change in the parameter value. This is likely to cause the limited device to be excluded from the network, since it would still use the previous version of the network parameters and is likely not to be heard by its neighbours which have been updated. For the limited device to be reintegrated in the network, it requires a special process which is very likely to require manual intervention from the user, can be long and is thus a large maintenance burden.

SUMMARY OF THE INVENTION

It is an object of the invention to propose a method for configuring a network which alleviates the above mentioned problems.

It is another object of the present invention to propose a method for configuring a network which takes into account the presence of and the limitations of the limited nodes that are operational in the network.

It is another object of the invention to propose a method which permits the configuration of the network without losing some nodes and maintaining a correct operation within the network.

In particular, it is intended with the method to maintain all the nodes up to date without causing any disruption in the operation of the network.

To this end, with reference to FIG. 5, a method 500 is proposed for updating a network configuration parameter in a network comprising a maintenance entity and a plurality of nodes, the method comprising at the maintenance entity, the steps of (a) detecting, at step 502, a potential presence in the network of at least one limited node, said limited node being able to receive data only within time periods;

(b) determining, at step 504, that an updated network configuration parameter value is required, said network configuration parameter being common to the at least one limited node and to the plurality nodes of the network;

(c) postponing, at step 506, a transmission of a signal for updating the network configuration parameter value at the plurality of nodes, based on the detection of the potential presence of the at least one limited node in the network;

(d) transmitting, at step 508, a triggering signal for triggering delivery of the updated network configuration parameter value to the limited device;

(e) transmitting, at step 510, the signal for updating the updated network configuration parameter value at the plurality of nodes.

As a consequence, the maintenance entity is able to take into account the presence of one or more limited nodes inside the network and postpone the reconfiguration of the rest of the network based on the presence of the limited nodes, for example until all the limited nodes have been reconfigured. This avoids "losing" the limited nodes that would cause joining process to be required.

The present invention also relates to a maintenance entity and to a communication network comprising the maintenance entity and a plurality of nodes.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 1A gives the format of the new ZGP System Maintenance Warning command;

FIG. 1B gives the format of the Options field of the new ZGP System Maintenance Warning command;

FIG. 2A gives the format of the ZGP Response command;

FIG. 2B gives the format of the ZGPP Tx Channel field of the ZGP Response command;

FIG. 3A gives the format of the modified ZGP Response command;

FIG. 3B gives the format of the Options field of the modified ZGP Response command;

FIG. 4A gives the format of ZGP Parameter Update Status command;

FIG. 4B gives the format of the Options field of the ZGP Parameter Update Status command.

DETAILED DESCRIPTION OF THE INVENTION

Figure 5:
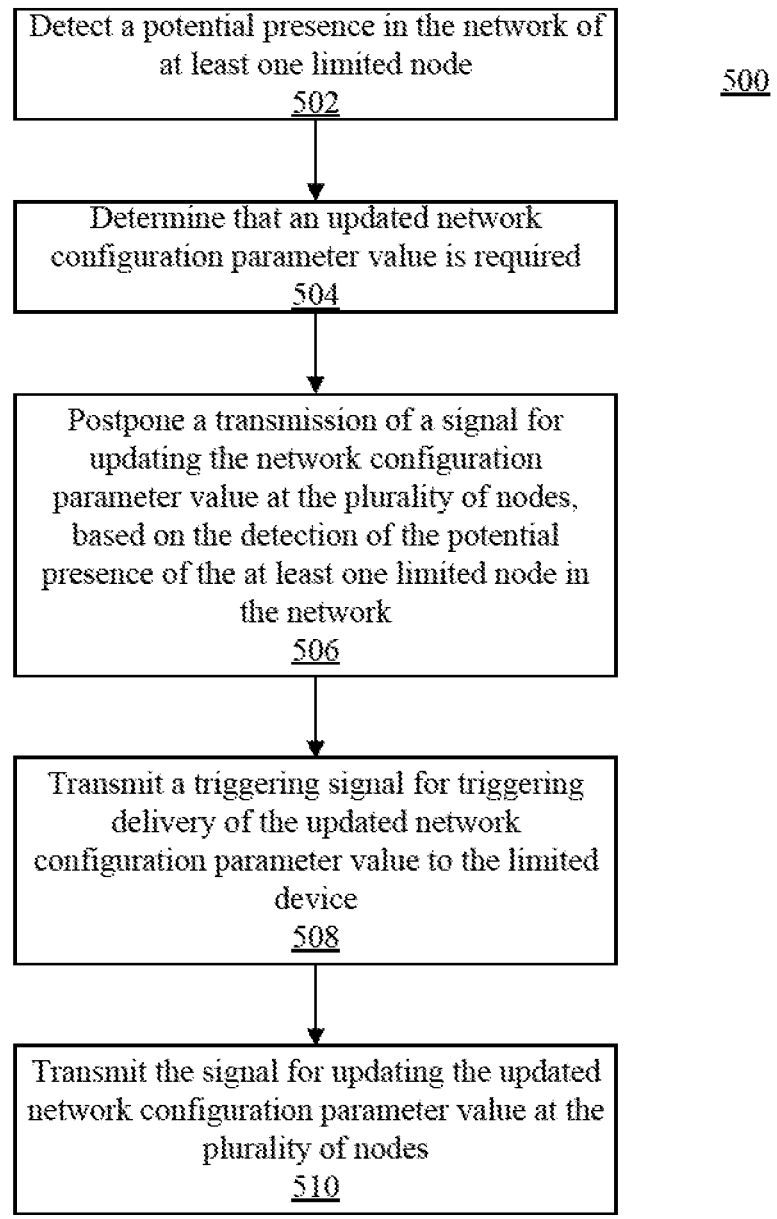
FIG. 5 is a block/flow diagram of an exemplary method for updating a network configuration parameter in a network comprising a maintenance entity and a plurality of nodes.

The present invention relates to a network comprising a plurality of nodes communicating one with another. In an exemplary embodiment of the invention, the network is a wireless mesh network. The invention will be described in the context of the ZigBee standard and more especially the ZigBee Green Power (ZGP) standard.

ZigBee Green Power Devices (ZGPDs), like energy-harvesting switches and batteryless sensors, are operating in ZigBee networks. In ZigBee networks, the configuration parameters, such as key, channel, PANId, etc., may need to change. ZGPDs with their very limited energy budget are neither guaranteed to receive the update before it takes effect, nor capable to discover the change and self-adjust. The result is the necessity of manual re-commissioning, which is time-consuming, manually-intensive due to limited communication and User Interface (UI) capabilities of the ZGPD, and also invalidates the major claim of energy-harvesting ZGPDs: their maintenance-free operation.

The present invention provides a solution for efficient and reliable delivery of changed network parameters to ZGPD operating in ZigBee networks. To this end, ZGP infrastructure devices, i.e. ZigBee devices which are capable of communicating with ZGPD according to the ZGP standard, are informed about the planned parameter change in advance by the responsible ZigBee maintenance entity, e.g. Trust Centre, ZigBee PAN Coordinator or Network Manager, such that they have time to update the ZGPDs. Once the update is performed, the ZGP infrastructure device can provide the responsible ZigBee maintenance entity with the update status response. New frame ZGP formats and frame extensions are defined for that purpose.

According to the ZigBee specification, ZigBee document 053474r19, "ZigBee specification", revision 19, Oct. 12, 2010, section 4.6.3.4, the security key update is done in a 2-message approach. With the first message, the key is distributed to all ZigBee devices in unicast or broadcast. With the second message, the devices shall switch to using the new key.

According to the ZigBee specification ZigBee document 053474r19, "ZigBee specification", revision 19, Oct. 12, 2010, section 3.10 and Appendix E, the channel and PANId updates are performed via a broadcast from the Network Manager/ZigBee PAN Coordinator device. A fixed time after reception of this message (nwkNetworkBroadcastDelivery-Time, corresponding to a couple of seconds in ZigBee-PRO networks), each device switches to the new configuration.

A drawback is that these mechanisms do not provide enough time for the ZGP infrastructure devices to forward the new parameter to the ZGPD. Furthermore, they do not allow for providing any feedback to the managing ZigBee entity as to how many and which ZGPDs were updated, and thus makes the after-update maintenance including manual re-commissioning yet more cumbersome. Specifically for the key updates, simply writing the new value to the zgpSharedSecurityKey attribute implemented by all ZGP infrastructure devices does not allow for a clear ZGPD update control process.

The present invention proposes to define a new capability on the ZigBee maintenance entity, to be aware of the potential or actual presence of ZGPD devices in the network and to manage the ZigBee parameter process accordingly. To this end, once the decision on parameter change has been taken and the potential or actual presence of the ZGPD in the network has been detected, the ZigBee maintenance entity postpones the ZigBee update. In the mean time, it triggers the ZGPD parameter update process first. It has the means for collecting the status responses from the ZGP infrastructure devices, and for determining the time of performing the ZigBee update based on some criteria, including the ZGPD update progress. To this end, the present invention defines new ZGP commands or extends existing ones. To allow for the dual-key operation in ZGP, an additional ZGP attribute, zgpAlternateSharedSecurityKey, is proposed.

According to the ZGP specification as defined in ZigBee Document 095499, "Draft ZigBee Green Power Specification", version 0.9, revision 16, May 16, 2011, a ZGPD, if it has sufficient energy budget, can, at selected times, receive a message for a limited time just after it has sent a message. In case of a ZGPD switch, the energy for both receiving and sending comes from one and the same rocker toggling by the user. Because of their energy budget limitations, those devices are also not able to discover the new parameters via an active search. The ZGPD indicates the reception capability in the regular frame it sends, upon user or sensor or application or time or harvester/energy storage trigger, by setting an RxAfterTx flag. Five (5) ms after this transmission, the ZGPD opens its radio for reception, for at least 0.576 ms and usually not much longer. Because of this very time-constrained mechanism, the senders do not use carrier-sense multiple access with collision avoidance (CSMA/CA), in order to not waste the transmission opportunity. Thus, it is crucial that only one device is transmitting to the ZGPD, otherwise, the multiple transmissions will collide with probability close to 1. To this aim, the ZGP specification defines a TempMaster election procedure, such that a sink controlled by the ZGPD selects one device from the proxies forwarding on behalf of this particular ZGPD and itself, if it is in radio range of the ZGPD, by using the criteria of distance to originating ZGPD and the ZGP infrastructure device's short address. However, this mechanism lacks the TempMaster resolution between multiple sinks controlled by the same ZPGD, especially if they appoint themselves as the Temp-Master. The present invention proposes to change the Temp-Master election procedure, and the ZGP Response frame to accommodate for that.

In addition, the current TempMaster/FirstToForward proxy election is performed immediately upon reception of ZGPD command frame with the RxAfterTx sub-field set. However, neither the address of the selected TempMaster nor the information if the sink is in direct radio range of the ZGPD is currently stored in the sink. Buffering the update frame until the next interaction with the ZGPD, to first determine the TempMaster and then prepare the ZGPD update frame introduces additional delay, and thus may lead to reduced update success rate. Therefore, an ad-hoc frame delivery to the ZGPD, e.g. like one triggered by ZigBee parameter update, is difficult to perform. To cope with this, it is proposed to store TempMaster related information in the sink. Specifically, it is proposed for the sink to store additionally the following information on each (RxAfterTx-capable) paired ZGPD:

(i) InRange flag—indicating if the sink was capable of receiving directly from the ZGPD and
  (ii) TempMaster field—indicating the last elected Temp-Master or the current first to forward proxy.
  (iii) TempMaster Distance field—indicating the distance to the TempMaster, also if it is the sink itself. These items can be stored in the Sink Table entry or separately; all or only some of them, as mandatory or optional items.

In order to perform the ZGPD update, the ZigBee maintenance entity has—in addition to the functions defined by the ZigBee specification—the following functions:

1) It knows about the potential presence of ZGP devices in the system/network.
2) It includes a policy to postpone the ZigBee parameter update to provide additional update opportunities for ZGPD.
   (i) According to an embodiment, it has the knowledge if any of the ZGPDs are or are not capable of reception. In addition, the ZigBee maintenance entity can know how many ZGPDs in the network are capable of reception, and also which ZGPDs have this capability. Alternatively, if it does not have capability to discover/information on the ZGPD reception capabilities, the ZigBee maintenance entity can leave the decision as to which ZGPD to try to update to the ZGP infrastructure devices. They can do so by checking for the RxOnCapability of this ZGPD. This differentiation is preferably done as early as possible in the update process, to limit the traffic and/or the delay associated with the update.
   (ii) If the ZigBee maintenance entity is capable of maintenance of the NWK key for ZGPD, it preferably will know if the key used to secure ZGPD communication is derived from the ZigBee NWK key being updated, and thus, if updating the ZGPD and postponing the ZigBee parameter update is required. Alternatively, if it does not have capability to discover/information on the ZGPD security key type used (by a particular ZGPD), the ZGPD maintenance entity/ZGP infrastructure devices make this decision, by checking for the security key type used (by a particular ZGPD). This is done as early as possible in the update process, to limit the traffic.
   (iii) If the ZigBee maintenance entity is capable of maintenance of the PANId, it preferably will know, if any of the ZGPDs uses the PANId value (rather than the default broadcast PANId value of 0xffff), and thus, if updating the ZGPD and postponing the ZigBee parameter update is required.
   (iv) The postponing may be dependent on the type of parameter updated and the ZigBee method of updating it. In one example, both the delivery of the new parameter to the ZigBee nodes, and the activation of the new parameter can be postponed. In another example, only the activation of the new parameter can be postponed; that's possible for the ZigBee Network Key update.
3) It may have a policy of triggering the ZigBee parameter update depending on the progress of ZGPD update. The policy criteria are up to the ZigBee maintenance entity vendor, the application profile using it, or the administrator of a particular network and can include:
   (i) giving ZGPD fixed amount of additional time for update
   (ii) all ZGPDs of a given subset updated; the subset definition may be based on some properties of the ZGPD e.g. their functionality, location, capability, priority, etc.
   (iii) given percentage of (a subset of) ZGPD updated.
4) The ZigBee maintenance entity has the capability of triggering a ZGPD update, by sending:
   (i) a ZGP System Maintenance Warning command;
   (ii) And/or a ZGP Response command—modified as proposed hereafter;
5) Optionally, the ZigBee maintenance entity has the capability of appointing a TempMaster for each ZGPD.
6) Optionally, it has the capability of tracking the progress of the ZGPD update, by reception of the ZGP Update Status command. It can request/suppress the update confirmation via appropriate setting in the update triggering command.
7) Further, the ZigBee maintenance entity may be able to present the update results to the user (e.g. network administrator), for example as a sitemap, indicating the location of the ZGPDs requiring manual update.
8) Optionally, the ZigBee maintenance entity is capable of re-triggering the update process for selected ZGPDs after the parameter update became effective in the ZigBee network, e.g. in case of a channel update by re-sending ZGP Response command to a selected TempMaster, instructing this TempMaster to temporarily move to the old operational channel.

All the above-mentioned functions can be performed by the actual responsible ZigBee maintenance entity (Trust Centre, ZigBee PAN Coordinator, Network Manager). Alternatively, only functions 1 and 2 are implemented in the ZigBee maintenance entity, and the actual ZGPD update and update progress tracking can be delegated to and performed by another entity, ZGPD maintenance entity, more knowledgeable about ZGPD (e.g. central controller or concentrator, a ZGP commissioning tool, etc). The ZGPD maintenance entity can be a separate device or a separate module/role of the ZigBee maintenance entity.

As explained above, the present invention proposes new message formats for enabling automatic parameter update in ZigBee networks incorporating ZGPDs. The present invention introduces a new command, the ZGP System Maintenance Warning command, the format of which is depicted in FIGS. 1A (Format of the command) and 1B (Format of the Options field of the command). This command allows a ZigBee maintenance entity to pre-announce a parameter change to (selected) ZGP infrastructure devices. We now describe the format of the ZGP System Maintenance Warning command in more details. Dependent on the knowledge of the ZigBee maintenance device, the command is sent in unicast or in broadcast. For the proxies to be able to act upon reception of this command, they have to be able to generate the ZGPD update commands, i.e. ZGPD Channel Configuration and ZGPD Commissioning Reply command.

The Parameters presence field indicates which fields carrying configuration parameter are present in the command. The meaning of the Parameters presence field is described in the following table.

| Parameters presence value | Fields present |
|---|---|
| 00 | New Channel |
| 01 | New NWK PANId |
| 10 | New Key |
| 11 | New PANId and New Key |

The value of the ZGPD list size subfield of the Options field equals the number of ZGPDs that the new configuration parameter must be forwarded to. A value of 0b0000 indicates that the list is empty; a value of 0b1111 indicates forwarding is required to all ZGPDs known to the receiving device.

If the PerformTempMasterElection flag has value 0b0, the device shall deliver the update itself (i.e. was selected as a TempMaster by the NWK Mgr); if the value equals 0b1, the receiving device shall perform the TempMaster election first. If the AckRequest subfield of the Options field has value 0b1, the ZigBee maintenance device is interested in receiving the SrcID of the ZGPDs to which the channel update has been forwarded. If the subfield has value 0b0, the ZigBee maintenance device is not interested in receiving these SrcIDs.

The Update time field indicates the time (in ms) available to deliver the update to the ZGPD. A value 0xffff for the Switch time field indicates undefined. When this value expires, and latest with the parameter switch, the receiving device may remove undelivered ZGPD commands from its zgpTxQueue.

The New channel field carries the new value for the operational channel. The New Channel field can take the following values: 0bxxxx0000 is channel 11, 0bxxxx0001 is channel 12, . . . , 0bxxxx1111 is channel 26.

The New key field carries a new value for the ZigBee Network Key.

The New PANId field carries a new value for the PANId parameter.

The ZGPD list field consists of a ZGPD list size set of 32-bit unsigned integers, each such integer representing the SrcID of a ZGPD. If the ZGPD list size has value 0b1111, the ZGP list is absent, and forwarding must take place to all ZGP devices known to the receiving device.

Some extensions to the ZGP System Maintenance Warning command are possible. More details on the required confirmation can be provided. Confirmation type can be requested and aligned with the ZGP Update Status command, e.g. including:
  010: ZGPD command sent to the ZGPD
  100: Acknowledgement from ZGPD received
  110: ZGPD seen to use the new parameter
Confirmation time, e.g. per ZGPD, after updating all ZGPD, or at a determined time, can also be requested.

In extension, additional Options sub-fields can be defined, allowing for specifying the type of the key being distributed: ZigBee NWK key, derivative ZGPD group key, independent ZGPD group key or ZGP TC-LK.

Alternatively to the ParametersPresence subfield on 2 bits, 3 bits for indicating presence/absence of each of the 3 fields independently could be used.

Alternatively to the ZGPD list size subfield and ZGPD list field in the form of a set of ZGPD SrcIDs, the ZGPD list size subfield can be skipped and a complex, length-indicating data type can be used ZGPD list field, e.g. an array of unsigned 32-bit integer.

The present invention proposes extensions to the ZGP Response command. The ZGP Response command is used in the current ZGP specification to tunnel the ZGPD command to be delivered to the ZGPD from the originating sink to the TempMaster proxy selected by the sink. The description of the ZGP Response command as given in ZGP is disclosed in FIG. 2A.

The ZGPP short address field indicates the address of the ZGPP which will transmit the Response GPDF to the ZGPD.

The ZGPPTxChannel field indicates the channel the Green Power Device Frame (GPDF) carrying the ZGPD command will be sent on. It shall be formatted as shown in FIG. 2B. When the ZGPP short address field is set to 0xffff, the ZGPPTxChannel field shall be ignored. The Transmit-Channel sub-field of the ZGPPTxChannel field can carry the value of the operational channel.

The ZGPD SrcID field carries the identifier of the ZGPD for which the GPDF frame is intended.

The fields ZGPD CommandID and ZGPD Command payload carry the input for the corresponding GPDF fields.

The ZGPD Command Payload field is an octet string. The first octet contains the payload length; the following octets the value for the GPDF field ZGPD Command payload. The value of 0xff indicates unspecified/no payload.

The present invention modifies the ZGP Response command as disclosed in FIGS. 3A and 3B (option fields) by renaming:
  the ZGPP short address field to TempMaster short address field;
  the ZGPP Tx Channel field to TempMaster Tx Channel field and by adding:
    an Options field, to indicate the properties of the pending update and the requested way to perform the process;
    a TempMaster Distance field, to guarantee quality in case of distributed TempMaster election; the TempMaster Distance field denotes the distance (in meters) between the ZGPD with SrcID as in the ZGPD SrcID field and the device with short address as in the TempMaster short address field, as measured by the latter device.
    and an TimeOut field, to indicate how much time is there for delivering the update the TimeOut field indicates the time (in ms) after which the undelivered ZGPD command can be removed from the zgpTxQueue.

In the Options field,
A value of 0b1 of the AckRequest subfield of the Options field indicates that the originator of the ZGP Response command expects an acknowledgement once the ZGPD is delivered; a value of 0b0 indicates that no acknowledgement is expected.

The Priority ZGPD command subfield, if set to 0b1, indicates that the ZGPD command (to be stored in the zgpTxQueue) carries priority information (such as channel/key update or commissioning commands) and shall not be overwritten by non-priority commands.

The additional fields of the ZGP Response command, as described here, may also be used for other instances of sending to ZGPD, e.g. for commissioning operation or for delivering data to the ZGPD. For example the TimeOut can be used to manage the zgpTxQueue; the AckRequest together with the ZGP Parameter Update Status command can be used for assessing the reliability of the ZGPD-TempMaster link.

The present invention proposes further extensions to the modified ZGP Response command.

More details on the required confirmation can be provided. Confirmation type can be requested (and aligned with the ZGP Update Status command), e.g. including:
  010: ZGPD command sent
  100: Acknowledgement from ZGPD received
  110: ZGPD seen to use the new parameter
Confirmation time, e.g. per ZGPD, after updating all listed ZGPD, after updating determined percentage of all listed ZGPD, and at a determined time, can also be requested.

The presence of the TimeOut field could be optional and indicated by a corresponding flag in the Options field or an appropriate value of the TempMaster short address field (e.g. one different than 0xffff).

The presence of the TempMaster Distance field could be optional and indicated by a corresponding flag in the Options field or an appropriate value of the TempMaster short address field (e.g. one different than 0xffff).

Additional criteria used for TempMaster election could be included in the command, e.g. freshness of the TempMaster information, i.e. the ZGPD Sequence Number/Frame Counter the TempMaster selection was based on.

The present invention proposes a new ZGP Parameter Update Status command, as depicted in FIGS. 4A and 4B.

The Key Update Report, Channel Update Report, PANId Update Report sub-fields, if set to 0b1, indicate that the command includes update status for the respective parameter.

The Update Status sub-field of the Options field of the ZGP Parameter Update Status command can take the following values:
   000—NOT updated: ZGPD not capable of reception
   001—NOT updated, ZGPD capable of reception
   101—NOT updated—parameter change does not need to be propagated to the ZGPD
   010—ZGPD command sent
   100—Acknowledgement from ZGPD received
   110—ZGPD seen to use the new parameter
   111—update criteria fulfilled
   Other: reserved The ZGPD list size sub-field of the Options field indicates the number of ZGPD SrcID present in the ZGPD list field. A value of 0b0000 indicates that the list is empty; a value of 0b1111 all ZGPDs known to the transmitting device. Note that the ZGPD list needs not equal the ZGPD list from the ZGP System Update Warning command, if received, but it contains of the ZGPD devices with update status as indicated in the Options subfield. Alternatively to the ZGPD list size subfield and ZGPD list field in the form of a set of ZGPD SrcIDs, the ZGPD list size subfield can be skipped and a complex, length-indicating data type can be used ZGPD list field, e.g. an array of unsigned 32-bit integers Different embodiments are provided below for ZigBee channel update. They are only given as example and shall not limit the scope of this patent defined in the claims.

A first example is a channel update with semi-centralised TempMaster election. The pre-requisites are that the ZigBee maintenance entity (ZigBee Network Manager or ZigBee PAN Coordinator in this case) is aware about the ZGPD presence in the network and that, for each RxAfterTx-capable ZGPD, at least one ZGPS controlled by that ZGPD is known to the ZigBee maintenance entity (e.g. as a result of commissioning or based on the planning, group assignment, or based on reading out sink tables). It further has some policy criteria when to perform the ZigBee parameter update (e.g. the ZGPD TimeOut elapsed, or given percentage of a given subset of ZGPD was successfully updated).

In a first step, the ZigBee maintenance entity sends ZGP System Maintenance Warning commands to a selected set of sinks. The ZigBee maintenance entity has determined the set of sinks and the ZGPD lists for these sinks in such a way that each RxAfterTx capable ZGPD occurs in the ZGPD list of exactly one transmitted ZGP System Maintenance Warning command. The Parameters presence sub-field indicates that the New Channel field is present. The NewChannel field indicates the value of the new operational channel. The Perform TempMaster election sub-field is set to 0b1. The AckRequest sub-field is set according to the update policy criteria of the ZigBee maintenance entity.

In a second step, each sink receiving a ZGP System Maintenance Warning command performs two substeps of determining the TempMasters and creating ZGPD Channel Configuration commands, whereby the order of performing them is irrelevant. Optionally, each sink checks the RxOn-Capability of every ZGPD in the ZGPDList field, and selects for update only those, for which it is TRUE. Each sink determines the TempMaster for each of the to be updated ZGPDs.

It has to be noted that a sink may select another sink to become TempMaster, if the first sink has the means of determining that the selected TempMaster sink (e.g. a ZGPCm) is in the range of the ZGPD (and optionally also paired to it).

For each to be updated ZGPD, the sink receiving the ZGP System Maintenance Warning command creates a ZGPD Channel Configuration command according to the ZGP specification with the value of the Operational Channel subfield of the Channel field set to the value of the NewChannel field from the ZGP System Maintenance Warning command. If the selected TempMaster is another device (proxy or sink), the sink sends a ZGP Response command. The value of the AckRequest subfield and other relevant (sub-)fields of the ZGP Response command are set to the value of the corresponding (sub-)field in the ZGP System Maintenance Warning command. The Priority ZGPD command subfield is set to 0b1. The TimeOut field has a value equal to the Update time field in the ZGP System Maintenance Warning command. The ZGP Command ID and ZGPD Command Payload field have the values as determined above.

In a third step, each TempMaster places the ZGPD command for the ZGPD in its zgpTxQueue, according to the priority bit, i.e. if there is already an entry for this SrcID in the zgpTxQueue, it is replaced with the current ZGPD Channel Configuration command, irrespective of whether the old message had the priority bit set or not. If the sink itself is TempMaster, it acts as if it received a ZGP Response command with the Priority ZGPD command subfield set to 0b1.

In a fourth step each ZGPP and ZGPS that is the temp master for some ZGPD sends the ZGPD command to each ZGPD for which it is a temp master whenever it has an opportunity to do so and less than TimeOut ms have elapsed since reception of the ZGP Response command/ZGP System Maintenance Warning command.

In a fifth step, if the AckRequest subfield has value 0b1, the temp master informs the ZigBee maintenance entity whenever it has sent the ZGPD Channel Configuration command to the ZGPD, by sending the ZGP Parameter Update Status command with the appropriate update status value.

In a sixth step, when its policy criteria for the update are fulfilled, the ZigBee maintenance entity triggers the ZigBee parameter update. The ZGP infrastructure nodes follow the ZigBee protocol in their ZigBee roles. At the latest when starting using new parameters, the undelivered priority entries may be removed from the zgpTxQueues.

Another example is channel update with distributed TempMaster election. The pre-requisites are that ZigBee maintenance entity (Network Manager or ZigBee PAN Coordinator in this case) is aware about the ZGPD presence in the network and is capable of sending ZGP System Maintenance Warning command for the required parameter update. It further has some policy criteria when to perform the ZigBee parameter update (e.g. the ZGPD TimeOut elapsed, or given percentage of a given subset of ZGPD was successfully updated).

In a first step, the ZigBee maintenance entity sends ZGP System Maintenance Warning command in broadcast. The Parameters presence sub-field indicates that the New Channel field is present. The AckRequest field is set according to the update policy criteria of the ZigBee maintenance entity.

The Perform TempMaster election subfield is set to 0b1. The ZGPD list size is set to 0b1111, indicating "all". The NewChannel field indicates the value of the new operational channel.

In a second step, each sink receiving a ZGP System Maintenance Warning command, for each of the ZGPDs it is paired to performs the following substeps, whereby the order of performing the steps of determining the TempMasters and creating ZGPD Channel Configuration command is irrelevant.

checks the RxOnCapability of the ZGPD
If the RxOnCapability is TRUE, determines the TempMaster. A sink may select another sink to become TempMaster, if the first sink has the means of determining that the selected TempMaster sink (e.g. a ZGPCm) is in the range of the ZGPD (and optionally also paired to it).
creates a ZGPD Channel Configuration command, with the value of the Operational Channel subfield of the Channel field set to the value of the NewChannel field from the ZGP System Maintenance Warning command.
sends a ZGP Response command, in broadcast, to announce such TempMaster, irrespective of whether it is a proxy or the sink itself. The ZGP Response command carries in the TempMaster short address field the address of the chosen TempMaster for the ZGPD indicated in the ZGPD SrcID field (even if the sink itself is the temp master); and in the TempMaster distance field the distance between the ZGPD and the TempMaster, as measured by the TempMaster. The value of the AckRequest subfield of the ZGP Response command is set to the value of the corresponding subfield in the ZGP System Maintenance Warning command. The Priority ZGDP Command subfield is set to 0b1. The TimeOut field has a value equal to the Update time field in the ZGP System Maintenance Warning command. The ZGPD Command ID and ZGPD Command Payload fields have values as determined above.

If the sink receives a ZGPD Response for a priority update for the same ZGPD, with a better TempMaster candidate, it may drop its own scheduled ZGP Response transmission (to limit traffic).

In a third step, each TempMaster (proxy/sink) places the ZGPD command for the ZGPD in its zgpTxQueue, according to the priority bit. If it subsequently receives a ZGPD Response for the same ZGPD, with a better TempMaster candidate, it shall remove the entry from the zgpTxQueue, without sending ZGP Parameter Update Status command.

In a fourth step, each TempMaster sends the ZGPD command to each ZGPD for which it is a temp master whenever it has an opportunity to do so and less than TimeOut ms have elapsed since reception of the command that triggered placement of the ZGPD command into the zgpTxQueue of this TempMaster: ZGP Response command /ZGP System Maintenance Warning command.

In a fifth step, if the AckRequest subfield has value 0b1, the temp master informs the ZigBee maintenance entity whenever it has sent a ZGPD Channel Configuration command, by sending the ZGP Parameter Update Status command with the appropriate update status value.

In a sixth step, the ZigBee maintenance entity triggers the ZigBee parameter update. The ZGP infrastructure nodes follow the ZigBee protocol in their ZigBee roles. At the latest with the reboot with new parameters, the undelivered priority entries may be removed from the zgpTxQueues.

Another example is channel update with centralized TempMaster election.

The pre-requisites for the first variant are the following: the ZigBee maintenance entity (Network Manager or ZigBee PAN Coordinator in this case) is aware about the ZGPD presence in the network and capable of generating the ZGPD commands for the required parameter update: the ZGPD Channel Configuration command in this case. It has knowledge about a tempMaster for each RxAfterTx-capable ZGPD (e.g. as a result of commissioning or based on the network planning, or based on reading out sink/proxy tables). It further has some policy criteria when to perform the ZigBee parameter update (e.g. the ZGPD TimeOut elapsed, or given percentage of a given subset of ZGPD was successfully updated).

In a first step, the ZigBee maintenance entity has determined the set of TempMasters for the RxAfterTx capable ZGPD in such a way that for each RxAfterTx capable ZGPD, one ZGP Response command is generated.

In a second step, the ZigBee maintenance entity sends ZGP Response commands to the selected set of TempMasters (sinks or proxies), preferably in unicast. The ZGP Response command contains the ZGPD Channel Configuration command for the operational channel update, and the ZGPD SrcID to deliver it to. The Priority ZGPD Command field is set to 0b1. The AckRequest field is set according to the update policy criteria of the ZigBee maintenance entity.

In a third step, for each ZGP Response command received, the TempMaster checks the RxOnCapability of the ZGPD and if TRUE, places the ZGPD command in its zgpTxQueue, according to the priority bit.

In a fourth step, each TempMaster sends the ZGPD command to each ZGPD for which it is a temp master whenever it has an opportunity to do so and when less than UpdateTime ms have elapsed since reception of the ZGP Response command.

In a fifth step, if the AckRequest subfield has value 0b1, the temp master informs the ZigBee maintenance entity whenever it has sent a ZGPD Channel Configuration command, by sending the Parameter Update Status Command with the appropriate update status value.

In a sixth step, the ZigBee maintenance entity triggers the ZigBee parameter update once the update policy criteria are fulfilled. The ZGP infrastructure nodes follow the ZigBee protocol in their ZigBee roles. At the latest with the reboot with new parameters, the undelivered priority entries may be removed from the zgpTxQueues.

In a seventh step, if some RxAfterTx capable devices were not updated, ZGP Response can be used after the channel switch has taken effect, to try to update the ZGPD (again). Then, the TempMaster Tx channel should be set to the old operational channel.

Another variant of the same example is the following. The pre-requisites are: the ZigBee maintenance entity (Network Manager or ZigBee PAN Coordinator in this case) is aware about the ZGPD presence in the network. It has knowledge about a TempMaster for each Rx after Tx capable ZGPD (e.g. as a result of commissioning or based on the network planning, or based on reading out sink/proxy tables), but it only has the capability of generating ZGP System Maintenance command. It further has some policy criteria when to perform the ZigBee parameter update (e.g. the ZGPD TimeOut elapsed, or given percentage of a given subset of ZGPD was successfully updated).

In a first step, the ZigBee maintenance entity sends ZGP System Maintenance Warning commands with NewChannel field present to a selected set of TempMasters (sinks or proxies), preferably in unicast. The ZigBee maintenance entity has determined the set of TempMasters and the ZGPD lists for these TempMasters in such a way that each RxAfterTx-capable ZGPD occurs in the ZGPD list of exactly one transmitted ZGP System Maintenance Warning command. The Perform TempMaster election subfield is set to 0b0. The AckRequest subfield and Update time field are set according to the update policy criteria of the ZigBee maintenance entity.

In a second step, each TempMaster checks the RxOnCapability of the ZGPD and if TRUE, it creates a ZGPD Channel Configuration command according to ZGP with the value of the Operational Channel subfield set to the value of the NewChannel field from the ZGP System Maintenance Warning command and places the ZGPD command in its zgpTxQueue, according to the priority bit. It is to be noted that, for the proxies, this requires the new capability of creating ZGPD update commands (not required by the current ZGP specifications).

In a third step, each TempMaster sends the ZGPD command to each ZGPD in the ZGPD list whenever it has an opportunity to do so and less than Update Time ms have elapsed since reception of the ZGP System Maintenance Warning command.

In a fourth step, if the AckRequest subfield has value 0b1, the temp master informs the ZigBee maintenance entity whenever it has sent a ZGPD Channel Configuration command, by sending the Parameter Update Status Command with the appropriate update status value.

In a fifth step, the ZigBee maintenance entity triggers the ZigBee parameter update. The ZGP infrastructure nodes follow the ZigBee protocol in their ZigBee roles. At the latest with the reboot with new parameters, the undelivered priority entries may be removed from the zgpTxQueues.

Another example is provided here, for channel update with cooperation of a ZigBee maintenance entity with a ZGPD maintenance entity. The pre-requisites: the ZigBee maintenance entity (Network Manager or ZigBee PAN Coordinator in this case) is aware about the presence of ZGPD maintenance entity in the network, is capable of sending ZGP System Maintenance Warning to it, and has a policy criteria to postpone the ZigBee parameter update. The ZGPD maintenance entity has knowledge about a TempMaster for at least each RxAfterTx capable ZGPD (e.g. as a result of commissioning or based on the network planning, or based on reading out sink/proxy tables).

In a first step, the ZigBee maintenance entity sends ZGP System Maintenance Warning command to the ZGPD maintenance entity. The Parameters presence sub-field indicates that the New Channel field is present. The NewChannel field carries the value of the new operational channel. The Perform TempMaster election sub-field is set to 0b1. The AckRequest sub-field is set according to the update policy criteria of the ZigBee maintenance entity; preferably, the extended requirements on the confirmation type and time are used.

In a second step, the ZGPD maintenance entity performs the following steps for each of the ZGPDs:
  checks the RxOnCapability of the ZGPD;
  If the RxOnCapability is TRUE, determines the TempMaster.
  creates a ZGPD Channel Configuration command, with the value of the Operational Channel subfield of the Channel field set to the value of the NewChannel field from the ZGP System Maintenance Warning command.
  sends a ZGP Response command, preferably in unicast to the selected TempMaster. The ZGP Response command carries in the TempMaster short address field the address of the chosen TempMaster for the ZGPD indicated in the ZGPD SrcID field (even if the sink itself is the temp master); and in the TempMaster distance field it carries the distance between the ZGPD and the TempMaster, as measured by the TempMaster. The value of the AckRequest subfield of the ZGP Response command is set to the value of the corresponding subfield in the ZGP System Maintenance Warning command. The Priority ZGDP Command subfield is set to 0b1. The TimeOut field has a value equal to the Update time field in the ZGP System Maintenance Warning command. The ZGPD Command ID and ZGPD Command Payload fields have values as determined above.

In a third step, for each ZGP Response command received, the TempMaster checks the RxOnCapability of the ZGPD and if TRUE, places the ZGPD command for in its zgpTxQueue, according to the priority bit.

In a fourth step, each TempMaster sends the ZGPD command to each ZGPD for which it is a temp master whenever it has an opportunity to do so and when less than TimeOut ms have elapsed since reception of the ZGP Response command.

In a fifth step, if the AckRequest subfield of the ZGP Response command has value 0b1, the temp master informs the ZGPD maintenance entity whenever it has sent a ZGPD Channel Configuration command, by sending the ZGP Parameter Update Status Command with the appropriate update status value.

In a sixth step, if confirmation was requested by the ZGP System Maintenance Warning command, once the (extended) confirmation criteria are fulfilled, the ZGPD maintenance entity informs the ZigBee maintenance entity about the progress of the ZGPD parameter update.

In a seventh step, the ZigBee maintenance entity checks the update progress and triggers the ZigBee parameter update. The ZGP infrastructure nodes, including ZGPD maintenance entity, follow the ZigBee protocol in their ZigBee roles. At the latest with the reboot with new parameters, the undelivered priority entries may be removed from the zgpTxQueues.

In an eighth step, if some RxAfterTx capable devices were not updated, the ZGPD maintenance entity can send a ZGP Response after the channel switch has taken effect, to try to update the ZGPD (again). Then, the TempMaster Tx Channel field of the ZGP Response should be set to the old operational channel.

Combination of the examples above is also possible, whereby for some selected ZGPD, unicast ZGP System Maintenance Warning/ZGP Response is sent to the paired sink/selected TempMasters, while for other ZGPD, groupcast/broadcast ZGP System Maintenance Warning command, or no update request is sent. Other update parameters (e.g. need for the confirmation) can also vary per ZGPD. The (way of performing an update) can be dependent on ZGPD capabilities, e.g. their location, importance, functionality, etc.

The update process can be iterative: If the selected sink/TempMaster does not have the capabilities requested by the update-related ZGP command targeted at it (e.g. sink/proxy not supporting bidirectional communication, not paired with the ZGPD, etc., ZGPT nominated as a TempMaster, etc.), it may respond with standard ZCL response indicating the appropriate error status and a new device can be nominated.

PANId updates can be performed analogously to the channel updates, with ZGP System Maintenance Warning command carrying the New PANId field and ZGP Response command carrying ZGPD Commissioning Reply command, subsequently delivered to the ZGPD.

The PANId update (attempt) may be skipped for ZGPDs without reception capabilities and ZGPDs not using the PANId (by default, ZGP specification allows to use PANId 0xffff).

ZGPD key updates resulting from the ZigBee NWK key updates can be performed analogously to the channel updates, with ZGP System Maintenance Warning command carrying the New Key field and ZGP Response command carrying ZGPD Commissioning Reply command, subsequently to be delivered to the ZGPD.

Key updates resulting from the ZigBee NWK Key update may be skipped for ZGPD without reception capabilities and ZGPDs using non-derivative key types.

It is proposed to introduce in ZGP specification an "Alternate ZGP key" attribute (which could have the same format as zgpSharedSecurityKey); it will provide an opportunity to update the ZGPDs with the new key also after the key switch, also in a completely distributed manner. Or course, as for the channel, also after the key switch, the ZigBee maintenance entity can appoint a particular TempMaster/sink to update the ZGPD.

Care must be taken, that appropriate balance between the security level resulting from some ZGP devices still accepting the old key, and the limiting of the number of ZGPD requiring manual re-commissioning.

Analogously to update triggered by ZigBee Network Key update, if the ZGPD communication uses derivative of the network key, the update of other ZGP security keys, e.g. the zgpSharedSecurityKey, i.e. the (independent) ZGP group key; key type; or the zgpLinkKey can also be performed in the same way.

It is to be noted that the maintenance entity in the illustrative embodiments above can have different other roles in the network. For example, it is possible to have the coordinator carrying out the functions of maintenance entity. As opposed, it is possible that the maintenance entity is a different node having these particular capabilities and for example only dedicated to the maintenance in the network of ZigBee Green Power Devices, like batteryless devices. It also has to be noted that what is claimed as a proxy node in the following can be any ZGP infrastructure node, i.e. either be a ZGP proxy (ZGPP) or a ZGP sink (ZGPS), according to the nomenclature of the ZGP specification (ZigBee document 095499r16ZB). Analogously, in the following, the term "linked" is used to describe any relationship a ZGP infrastructure device may have with a ZGPD, i.e. a Sink Table entry and/or an active Proxy Table entry.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. A method for configuring a network comprising a maintenance entity and a plurality of nodes, the method comprising the steps of:
   (a) determining that at least one node present on the network is at least one limited node, wherein the limited node is limited in that the limited node is incapable of receiving data within time periods and wherein the limited node is a ZigBee Green Power Device;
   (b) determining that an update to a network configuration parameter value is required, said network configuration parameter being common to the least one limited node and to the plurality of nodes of the network, which are distinct from the at least one limited node;
   (c) postponing, in response to the determining that at least one node present on the network is at least one limited node, a transmission of a first signal, wherein the first signal is for updating the network configuration parameter value at the plurality of nodes;
   (d) transmitting a triggering signal for triggering delivery of an updated network configuration parameter value to the limited node; and
   (e) transmitting the first signal to update the network configuration parameter value at the plurality of nodes.

2. The method of claim 1, wherein step (a) further comprises the maintenance entity checking within an internal register whether the at least one limited node is operational in the network.

3. The method of claim 2, wherein step (a) further comprises finding whether a proxy node is linked to the at least one limited node, and deciding whether to initiate a new proxy node election for the limited node.

4. The method according to claim 3, wherein a proxy node is linked to the at least one limited node, and wherein step (d) contains a substep (d1) of transmitting the triggering signal for triggering delivery of the updated network configuration parameter value to the at least one limited node to exactly one proxy node per each of the at least one limited node.

5. The method according to claim 3, wherein the at least one limited node is a set of limited nodes and wherein step (d) comprises the sub-step of:
   (d2) transmitting, at the maintenance entity, to a set of first nodes, a signal for triggering delivery of the updated network configuration parameter value to the limited nodes, each of the nodes in said set of first nodes being arranged to communicate with the limited nodes, said triggering signal causing the set of first nodes to appoint a proxy node for each limited node from the set of limited nodes, said proxy node being responsible for delivering the updated network configuration parameter value to the corresponding limited node.

6. The method according to claim 1, wherein step (d) comprises the sub-step of:
   (d3) at the maintenance entity, initiating a proxy node election for the at least one limited node by transmitting the updated network configuration parameter value to a proxy election device,
   (d4) at said proxy election device, carrying out the proxy node election and forwarding the updated network configuration parameter value to a set of selected proxies, said forwarding making each of the selected proxies responsible for delivering the updated network configuration parameter value to the limited node for which it proxies.

7. The method of claim 4, further comprising sub-step of:
(c6) postponing forwarding of the updated network configuration parameter value to the plurality of nodes until at least one update criterion related to an update of the at least one limited node is fulfilled.

8. The method of claim 7, wherein the update criterion is based at least partly on reception of an update confirmation message at the maintenance entity, said update confirmation message being indicative of a successful reception by the limited node of the updated network configuration parameter value.

9. The method of claim 7, wherein the update criterion is based at least partly on at least one of the following criteria: the amount of time elapsed since step (b), the amount of time elapsed since step (d), a priority level of the network configuration parameter update, a property of the limited node including an application function, a location, a capability or a reporting behavior, number/properties of the at least one limited node for which an update confirmation message was received, number/properties of the at least one limited node for which an update confirmation message indicative of an update being sent/delivery process being triggered was received, number/properties of limited nodes for which an update confirmation message that is indicative of an updated parameter being used was received.

10. The method of claim 1, wherein the limited node is a batteryless device, comprising energy harvesting means, said device being able to receive a data message only within a time window following an actuation of the energy harvesting means by a user or within a time window following harvesting of energy from the environment.

11. The method of claim 1, wherein the updated network configuration parameter value includes at least one of a channel identifier, a security key, a security key type, a network identifier, a reporting interval, an operation mode, or a maintenance entity identifier.

12. The method of claim 1, wherein steps (c) and step (d) are omitted, if in step (a) or step (b) at least one of the following conditions is met: no limited nodes are present in the network, no limited nodes capable of over the air reception of updated network configuration parameter are present in the network, the updated network configuration parameter is not applicable to the limited nodes, the updated network configuration parameter is not applicable to the limited nodes capable of over the air parameter reception.

13. The method of claim 1, wherein the maintenance entity is split in two parts, the first part being located in a first coordination entity and carrying out at least steps (a), (b), (c) and (e) and the second part being located in a second coordination entity for limited nodes and carrying out at least step (d).

14. A maintenance entity for configuring a network comprising a plurality of nodes, said maintenance entity comprising:
at least one hardware processor configured to: (a) determine that at least one node present on the network is at least one limited node, wherein the limited node is limited in that the limited node is incapable of receiving data within time periods and wherein the limited node is a ZigBee Green Power Device, (b) determine that an update to a network configuration parameter value is required, said network configuration parameter being common to the at least one limited node and to the plurality of nodes of the network, which are distinct from the at least one limited node and (c) perform, in response to the determination that at least one node present on the network is at least one limited node, a postponement of a transmission of a first signal, wherein the first signal is for updating the network configuration parameter value at the plurality of nodes; and
at least one transmitter configured to (d) transmit a triggering signal for triggering delivery of an updated network configuration parameter value to the limited node, and (e) transmit the first signal to update the network configuration parameter value at the plurality of nodes.

15. A communication network comprising the maintenance entity of claim 14 and a plurality of nodes.

16. The maintenance entity of claim 14, wherein the postponement comprises determining a time for performing said updating the network configuration parameter value at the plurality of nodes.

17. The method of claim 1, wherein the postponing comprises determining a time for performing said updating the network configuration parameter value at the plurality of nodes.

* * * * *